Dec. 1, 1931.   H. FRISCHER   1,834,693
MEANS OF PROMOTING CHEMICAL REACTIONS
Filed June 11, 1927
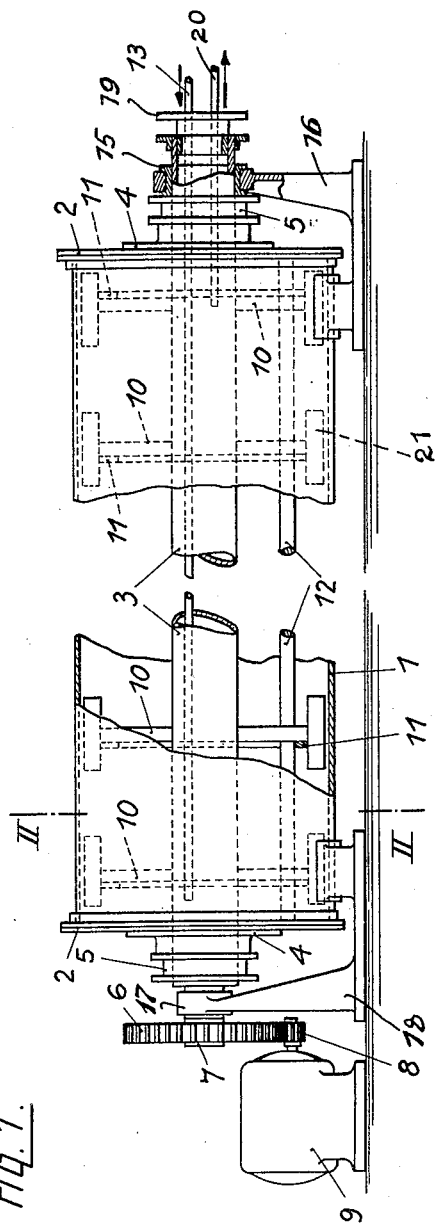
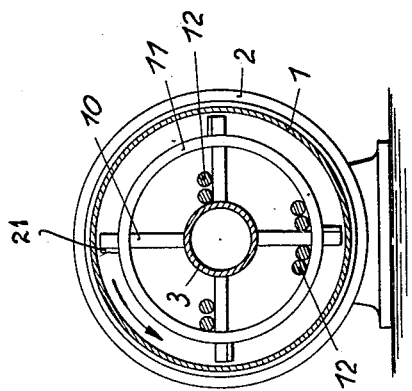
Inventor:
Hermann Frischer
by
Atty.

Patented Dec. 1, 1931

1,834,693

UNITED STATES PATENT OFFICE

HERMANN FRISCHER, OF COLOGNE-LINDENTHAL, GERMANY

MEANS OF PROMOTING CHEMICAL REACTIONS

Application filed June 11, 1927, Serial No. 198,097, and in Germany December 4, 1926.

My invention refers to chemical reactions, more especially of the kind in which liquids are caused to act on solids, for instance an acid on a salt, as is the case for instance in the manufacture of acids such as acetic acid, formic acid, hydrofluoric acid or nitric acid by the interaction of salts of these acids with sulfuric acid or phosphoric acid. In these reactions the liquid acid acts on a more or less comminuted salt and in order to promote the reaction and to ensure the continuous escape of the acid vapors liberated from the salt care must be taken to avoid baking of the mixture of salt and liquid acid and the adhering of this mass to the walls of the container.

In the practice of these processes of manufacture as hitherto followed the reacting components have been placed as a rule in retorts, muffles or rotary drums, without it being possible to avoid the drawbacks mentioned above.

I have now ascertained that chemical reaction between solids and liquids, and more especially between salts and acids of the kind aforesaid can be carried through in continuous operation and with uniform concentration of the products resulting in the reaction, if the reacting components are placed in horizontally extending cylindrical drums heated by suitable means and provided with agitating or stirring means capable of free movement within the drum, thereby preventing the baking of the mixture and providing for a continuous development of the gases of distillation.

In the drawings affixed to this specification and forming part thereof apparatus embodying my invention is illustrated diagrammatically by way of example. In the drawings Fig. 1 is an elevation, with part of the walls broken away, and Fig. 2 is a section on the line II—II in Fig. 1.

Referring to the drawings, 1 is a horizontally extending drum forming the reaction vessel proper. 2, 2 are covers detachably mounted on the ends of the drum, and 3 is a hollow shaft extending axially across the drum and through tubular extensions 4 mounted on the covers. 5, 5 are stuffing boxes serving for packing the shaft, and 15 is a bearing supporting one end of the shaft and resting on a standard 16. 17 is another bearing forming part of a similar standard 18 and supporting a journal 7 fixed to the other end and carrying a gear wheel meshing with a pinion 8 mounted on the shaft of an electromotor 9. 19 is a cap secured in the open end of shaft 3 and supporting a steam pipe 13 extending through it and across the entire length of the hollow shaft, the steam escaping through an outlet pipe 20, as shown by the arrows. 30 is a charging hopper, 31 is the outlet tube for the acid vapours, 32 is an outlet for the salts resulting in the reaction, and 33 is a truck to receive these salts.

On the shaft 3 are mounted radially extending arms 10, 10, on the free ends of which are mounted stirring members 21. A ring 11 is fixed to the arms extending in the same transversal plane. 12 are metal rods or tubes extending across the entire length of the drum and resting loosely on the arms 10 and rings 11 respectively.

In the operation of the device, after the reacting substances have been introduced into the drum either by a manhole (not shown) or through one of the end openings, after removal of one of the covers 2, shaft 3 is set rotating by starting the electrometer 9 and the arms 10 are carried along in the direction of the arrow in Fig. 2. The bars will now roll on the arms 10, the rings 11, and the surface of the shaft 3, according to the position of the quadrant of which they form part. The reacting mixture is heated by steam entering through pipe 13 and escaping through pipe 20, but obviously any other heating means may be resorted to as well.

The horizontal drum forming the reaction vessel offers the advantage that the material acted upon is evenly distributed over the heating surface, being at the same time spread through the action of the stirring device across the cylindrical chamber formed by the drum, whereby greater surfaces of the reacting mixture are exposed to the action of heat. The bars or tubes 12 freely rolling on their supporting arms and rings and on the shaft surface prevent any salts from adhering to these parts and more particularly to the shaft itself forming the heating surface, whereby a continuous passage of the distillation vapors is guaranteed.

I have further ascertained that contrary to what could be expected, the cylindrical drums as well as the stirring elements, including the shaft, arms, rings, and bars, instead of being made of acid-proof cast-iron can now be made of ordinary wrought iron or ordinary steel without the wrought iron or steel being exposed to undue corrosion. Owing to this discovery thinner sheet metal can be used in the construction of the drum and the wall thickness of the hollow shaft can be less also.

I have further ascertained that in operating in apparatus such as described, when manufacturing volatile acids such as above mentioned by acting on salts of these acids with sulfuric acid or phosphoric acid, an increased yield is obtained, as compared with the operation in muffles or retorts having the same heating surface. It has further been found that the stationary drums provided with rotary agitators or stirring devices last almost twice as long as rotary drums.

Obviously the apparatus shown and described can be operated also under increased or reduced pressure.

I wish it to be understood that I do not desire to be limited to the exact details of construction shown and described for obvious modifications will occur to a person skilled in the art.

I claim—

1. Reaction vessel comprising a container, a shaft extending across said container, a bar loosely movable in said container and extending in parallel with said shaft, and rings surrounding said shaft and said bar so as to prevent contact between said bar and the container wall.

2. Reaction vessel comprising a container, a shaft extending across said container, substantially radially directed arms on said shaft, rings connecting the outer parts of said arms, and a bar loosely resting between said arms and said rings in parallel with said shaft.

3. Reaction vessel comprising a container, a hollow steel shaft extending across said container, substantially radially directed arms on said shaft, rings connecting the outer parts of said arms, a bar loosely resting between said arms and said rings in parallel with said shaft, and heating means associated with said shaft.

In testimony whereof I affix my signature.

HERMANN FRISCHER.